United States Patent
Ohkubo

(10) Patent No.: US 7,280,455 B2
(45) Date of Patent: Oct. 9, 2007

(54) OPTICAL INFORMATION RECORDING CONDITION ADJUSTMENT METHOD, RECORDING/REPRODUCING METHOD AND APPARATUS

(75) Inventor: Shuichi Ohkubo, Tokyo (JP)

(73) Assignee: NEC Corporation, Tokyo (JP)

( * ) Notice: Subject to any disclaimer, the term of this patent is extended or adjusted under 35 U.S.C. 154(b) by 567 days.

(21) Appl. No.: 10/500,679

(22) PCT Filed: Feb. 5, 2003

(86) PCT No.: PCT/JP03/01193

§ 371 (c)(1),
(2), (4) Date: Jun. 30, 2004

(87) PCT Pub. No.: WO03/067578

PCT Pub. Date: Aug. 14, 2003

(65) Prior Publication Data
US 2005/0213460 A1   Sep. 29, 2005

(30) Foreign Application Priority Data
Feb. 7, 2002   (JP)   ............................. 2002-030391
Oct. 22, 2002   (JP)   ............................. 2002-306990

(51) Int. Cl.
*G11B 5/09*   (2006.01)
(52) U.S. Cl. ................. 369/59.21; 369/59.11
(58) Field of Classification Search .................... None
See application file for complete search history.

(56) References Cited

U.S. PATENT DOCUMENTS 6,757,239 B2 * 6/2004 Minamino et al. ....... 369/275.4
7,088,663 B2 * 8/2006 Sasaki et al. ............ 369/59.11
7,113,468 B2 * 9/2006 Udagawa .................. 369/59.11
7,126,897 B2 * 10/2006 Takeuchi et al. ......... 369/47.53

FOREIGN PATENT DOCUMENTS

| JP | 9-63056 | 3/1997 |
| JP | 11-126433 | 5/1999 |
| JP | 2001-126260 | 5/2001 |
| JP | 2002-25060 | 1/2002 |

OTHER PUBLICATIONS

Shoji, Mamoru, et al., "Reduction of Phase Jitter in Pulse Width Modulation recording on a Phase Change Rewritable Disk", Shingaku Technical Report MR93-55, CPM93-107 (1993), pp. 13-18.

* cited by examiner

*Primary Examiner*—Wayne Young
*Assistant Examiner*—Adam R. Giesy
(74) *Attorney, Agent, or Firm*—Scully, Scott, Murphy & Presser, P.C.

(57) ABSTRACT

The recording strategy is optimized by determining a pulse response so as to minimize the difference between the reproduced waveform obtained by recording and reproducing the recording pulse signal wherein the record data is superposed with a high-frequency pulse and the waveform calculated by convolution of the record data and pulse responses. In this process, a single recording pulse waveform is recorded on a single track of the optical recording medium for three or more times, and sampled values $z_{p,1}, \ldots, z_{p+3,1}, \ldots, \ldots, z_{p,2}, \ldots, z_{p+3,2}, \ldots, z_{p,3}, \ldots, z_{p+3,3}, \ldots$, of the reproduced waveforms reproduced therefrom are averaged in the order of the sampling to be used as the data for the reproducing waveform. Here, the first suffix for z represents the order of the sampling, whereas the second suffix represents the number of iterated times. The use of the averaged data can remove the influence by the random noise on the reproduced waveform.

19 Claims, 12 Drawing Sheets

$Z_{p,1}, Z_{p,2}, Z_{p,3}, Z_{p+3,1}, Z_{p+3,2}, Z_{p+3,3}$ : time-series data of reproduced waveforms

OPTICAL INFORMATION RECORDING CONDITION ADJUSTMENT METHOD, RECORDING/REPRODUCING METHOD AND APPARATUS

TECHNICAL FIELD

The present invention relates to a method for adjusting a recording condition to record and reproduce information by irradiating an optical recording medium with laser light, and to recording/reproducing method and apparatus.

BACKGROUND TECHNOLOGY

Optical recording media include rewritable optical discs such as a magneto-optical disk and a phase-change optical disk. Typical recording techniques for recording the record data on such an optical recording medium include a mark position recording technique wherein the position of the record mark has information, and a mark edge recording technique wherein each of the front edge and rear edge of the record mark has information.

The mark edge recording technique is suited to high recording density; however, the length of the record mark must be controlled with a higher accuracy so as to allow the record data to be reproduced with a higher fidelity. The length of the record mark on the magneto-optical recording disk or the phase-change optical disk is determined by a temperature rise of a recording film caused by irradiation with laser light. The temperature rise during the irradiation of the optical disk with the laser light is changed depending on the structure and the linear speed of the disk.

During recording the record data on the optical recording disk, a recording technique, or so-called recording strategy technique, is generally used, wherein the waveform of the record data is divided into a plurality of short pulses. For controlling the temperature rise to control the mark length with a higher accuracy, the intensity and the width of each of the plurality of short pulses in the divided recording pulse waveform (laser-modulated pulse waveform) must be optimized depending on the structure of the disk. "Shingaku Technical Report MR93-55, CPM93-107, pp 13-18, 1993" describes an example of the techniques for optimizing the recording strategy such as the pulse width or pulse interval. In this technique, the lengths (time intervals) between the reference mark and the front and rear edges of the subject mark to be measured are measured to determine the irradiation starting point and the pulse width of the recording pulse waveform.

However, as the record mark length recorded on the disk is reduced along with the development of the higher recording density, there sometimes occurs a case where the signal amplitude of the reproduced waveform is reduced down to a level below the slice level of a slicer used for measuring the record mark. This results in that the positions of the front edge and rear edge of the subject mark cannot be measured with a higher accuracy, and thus it is difficult to optimize the recording strategy by using the conventional technique such as described above.

As a technique for optimizing the recording strategy under the condition of a high recording density, JP-A-2001-126260 describes a technique for deriving a pulse response from the reproduced waveform in the premise that the recording/reproducing system is linear, to optimize the recording strategy. According to this conventional technique, $h_j$ providing minimum values for $\epsilon'$ are obtained as time-series data of the pulse response, the $\epsilon'$ being expressed by the following formula (1):

$$\varepsilon' = \sum_k \left( y_l - \sum_j a_{l-j} \times h_j \right)^2, \quad (1)$$

wherein $a_i$ is a record data such as expressed by "1" or "0", $y_i$ are time-series data obtained by sampling the reproduced waveform based on the clock frequency of the record data. The range for "j" is determined by the range where the time-series data $h_j$ assume non-zero finite values, and "k" is determined by the number of all the time-series data of the reproduced waveform. Subsequently, $h_j$ and the minimum values of $\epsilon'$ in each recording pulse waveform are similarly derived by changing the each recording pulse waveform, and the recording pulse waveform providing the smallest value among the minimum values of $\epsilon'$ is determined as the optimum recording pulse waveform.

In a linear recording/reproducing system, assuming that $h_j$ is an output (generally referred to as "pulse response" or "impulse response") of the recording/reproducing system during recording/reproducing a 1-bit data, the reproduced waveform output at a specified time is expressed, if there is no noise, by the following formula (2):

$$\Sigma(a_{i-j} \times h_j) \quad (2).$$

The pulse response assumes different values for the recording densities and beam diameters or recording/reproducing conditions (such as tilt and defocus). The above $\epsilon'$ is the index for evaluating the nonlinear components of the reproduced waveform, wherein a smaller value for $\epsilon'$ means a higher linearity of the reproduced waveform.

However, in the conventional technique as described above, if the recording density is extremely high to extensively reduce the signal amplitude of the reproduced waveform, the influence by noise cannot be neglected, and accordingly, the accuracy of the time-series data $h_j$ of the pulse response and the minimum values of $\epsilon'$ is degraded, whereby there arise the problem that the optimization of the recording strategy is difficult.

In the conventional technique as described above, the clock frequency is extracted from the reproduced waveform, and the sampling of the reproduced waveform is performed using this clock frequency. The extraction of the clock frequency from the reproduced waveform needs a PLL circuit, to thereby complicate the circuit structure. In addition, data having a data length of around 1000 bits, for example, is needed depending on the circuit performance of the PLL, whereby there arises the problem that the signal processing takes a long time.

Although optimization of the recording pulse width is mainly described in the conventional technique, the PLL circuit does not necessarily operate in order for adjusting the laser power if the laser power is inadequate, to raise the problem that the pulse response cannot be derived. Moreover, although the conventional technique uses only the absolute value (the above $\epsilon'$) of the deviation from the linearity, there arises a need for normalizing the deviation from the linearity in some format, because the signal amplitude changes together with the change of the recording power in consideration of the adjustment of the recording power.

DISCLOSURE OF THE INVENTION

In view of the problems of the conventional technique, it is an object of the present invention to provide a method for adjusting the recording condition by which the recording condition (recording strategy and laser power) are optimized with accuracy and in a smaller time length even in the case of a higher recording density, as well as recording/reproducing method and recording/reproducing apparatus for the optical information.

The present invention provides a method for adjusting a recording condition, including the steps of: irradiating an optical recording medium with laser light having a recording pulse waveform generated based on a recording signal, which is in synchrony with clock cycles, to form a record mark group on the optical recording medium; reading the record mark group to obtain a reproduced waveform, and adjusting the recording condition by sampling the reproduced waveform at a period shorter than a clock period to evaluate a linearity of the reproduced waveform. In a preferred embodiment of the present invention, the time-series data of the reproduced waveform for respective clock cycles are obtained by interpolating the sampled values of the reproduced waveform.

The present invention provides an adjusting condition for adjusting the recording condition by obtaining an index of the linearity by the following formula (3):

$$\varepsilon = \sum_l \left( y_k - \sum_i a_{k-i} \times h_i \right)^2 \quad (3)$$

(i being an integer satisfying $0 \leq i \leq m$), wherein $[a_0, a_1, \ldots, a_k, \ldots, a_{n-1}, a_n]$ represent the time series data for the respective clock cycles of the clock for recording the optical recording medium, $[y_0, y_1, \ldots, y_k, \ldots, y_{n-1}, y_n]$ represent time-series data of the reproducing waveform for the respective clock cycles (n being an integer not smaller than zero, and k being an integer satisfying $0 \leq k \leq n$), and $[h_0, h_1, \ldots, h_m]$ represent pulse responses of a recording/reproducing system corresponding to a specific recording/reproducing condition (m being an integer satisfying $0 \leq m \leq n$).

Here, $h_i$ is a value changing depending on the recording pulse waveform. Accordingly, the value for $\varepsilon$ can be adjusted by adjusting this $h_i$ (or adjusting the recording condition). It is to be noted that a suitable recording condition can be obtained by adjusting the above $\varepsilon$ to a smaller value.

The present invention provides, in another embodiment, a method for adjusting a recording condition, the method including: irradiating an optical recording medium with laser light having a recording pulse waveform generated based on a recording signal, which is in synchrony with clock cycles, to form a record mark group on the optical recording medium; and reading the record mark group to obtain a reproduced waveform, characterized by obtaining an index of the linearity by the following formula (4):

$$R1 = (n+1) \times \frac{\sum_i h_i^2}{\sum_k \left( y_k - \sum_i a_{k-1} \times h_i \right)^2} \quad (4)$$

(i being an integer satisfying $0 \leq i \leq m$), wherein $[a_0, a_1, \ldots, a_k, \ldots, a_{n-1}, a_n]$ represent the times-series data for the respective clock cycles of the clock for recording the optical recording medium, $[y_0, y_1, \ldots, y_k, \ldots, y_{n-1}, y_n]$ represent time-series data of the reproducing waveform for the respective clock cycles (n being an integer not smaller than zero, and k being an integer satisfying $0 \leq k \leq n$), and $[h_0, h_1, \ldots, h_m]$ represent pulse responses of a recording/reproducing system corresponding to a specific recording/reproducing condition (m being an integer satisfying $0 \leq m \leq n$).

Here, $h_i$ is a value changing depending on the recording pulse waveform. Accordingly, the value for R1 can be adjusted by adjusting this $h_i$ (adjusting the recording condition). It is to be noted that a suitable recording condition can be obtained by adjusting the above R1 to a larger value.

In case for employing the above configuration, by setting so as to satisfy $10 \times \log R1 > 20 - 20(l/w)$, wherein w represents the beam diameter of the laser beam used for recording/reproducing information and l represents the shortest mark length to be recorded on the optical-information recording medium, the bit error rate (b.e.r) can be suppressed down to a specified value or below. More specifically, in the present invention, the bit error rate can be also adjusted by adjusting R1.

The present invention provides, in another embodiment, a method for adjusting a recording condition, the method including: irradiating an optical recording medium with laser light having a recording pulse waveform generated based on a recording signal, which is in synchrony with clock cycles, to form a record mark group on the optical recording medium; and reading the record mark group to obtain a reproduced waveform, characterized by obtaining an index of the linearity by the following formula (5)

$$R2 = \frac{\sum_k y_k^2}{\sum_k \left( y_k - \sum_i a_{k-1} \times h_i \right)^2} \quad (5)$$

(i being an integer satisfying $0 \leq i \leq m$), wherein $[a_0, a_1, \ldots, a_k, \ldots, a_{n-1}, a_n]$ represent the times-series data for the respective clock cycles of the clock for recording on the optical recording medium, $[y_0, y_1, \ldots, y_k, \ldots, y_{n-1}, y_n]$ represent time-series data of the reproducing waveform for the respective clock cycles (n being an integer not smaller than zero, and k being an integer satisfying $0 \leq k \leq n$), and $[h_0, h_1, \ldots, h_m]$ represent pulse responses of a recording/reproducing system corresponding to a specific recording/reproducing condition (m being an integer satisfying $0 \leq m \leq n$).

Here, $h_i$ is a value changing depending on the recording pulse waveform. Accordingly, the value for R2 can be adjusted by adjusting this $h_i$ (adjusting the recording condition). It is to be noted that a suitable recording condition can be obtained by adjusting the value for R2 to a larger value. In addition, the bit error rate can be suppressed down to the specified value or below by adjusting R2 so as to satisfy $10 \times \log R2 > 21 - 20(l/w)$, wherein w represents the beam diameter of the laser beam used for recording/reproducing information and l represents the shortest mark length to be recorded on the optical-information recording medium, the bit error rate (b.e.r) can be suppressed down to a specified value or below. More specifically, in the present invention, the bit error rate can be also adjusted by adjusting R2.

In addition, the present invention may include, in the recording condition adjusting step, either the steps of recording a plurality of record mark groups on the optical recording medium by using a single recording pulse waveform, reproducing the same to sample a plurality of reproduced waveforms, and averaging the sampled values, or the steps of recording a record mark group by using a recording pulse waveform on the optical recording medium, reproducing the same for a plurality of times to sample a plurality of reproduced waveforms, and averaging the sampled values. In this case, a more accurate adjustment can be obtained.

Further, in the recording condition adjusting method according to the present invention, especially in the case of the medium being a phase-change optical recording medium, an overwrite operation may be conducted twice or more before the reproducing, upon obtaining the reproduced waveform. In this case, the recording condition can be adjusted more accurately.

A recording/reproducing apparatus according to the present invention employs the recording condition adjusting method(s) as described above.

More specifically, the present invention provides an apparatus for recording/reproducing optical information, including an optical head irradiating an optical recording medium with laser light to receive reflected light therefrom, a laser drive for changing an optical intensity of a laser output thereof, and a control section having the functions of: converting a recording signal into a recording pulse waveform to transmit the same to the laser drive; sampling a reproduced waveform, reproduced from record marks on the optical recording medium, at a period shorter than a clock period; interpolating the sampled values; evaluating a difference between a waveform obtained by convolution of pulse responses determined from the reproduced waveform and the recording signal and a waveform obtained, by sampling the reproduced waveform and interpolating sampled values thereof, to adjust a width or power of the recording pulse waveform. In the recording/reproducing apparatus according to the present invention, the above $\epsilon$ or the above R1 or R2 may be evaluated to adjust the recording pulse waveform.

BEST MODE FOR CARRYING OUT THE INVENTION

Hereinafter, the present invention will be described in more detail based on the embodiment of the present invention with reference to accompanying drawings.

Figure 1:
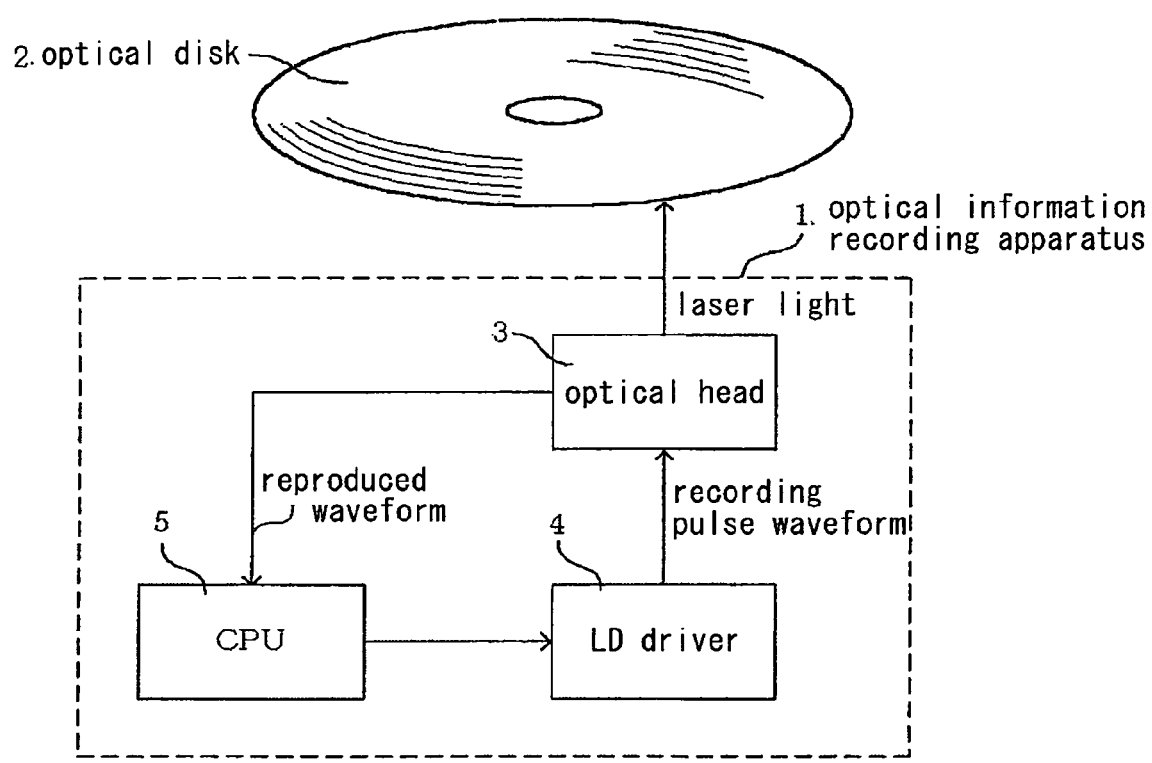
FIG. 1 is a block diagram of an optical-information recording apparatus according to an embodiment of the present invention.

FIG. 1 shows an optical-information recording apparatus according to an embodiment of the present invention. The optical-information recording apparatus of the present embodiment employs a process of deriving pulse response from a reproduced waveform and adjusting the recording/reproducing condition based on the information obtained from the pulse response. For deriving the pulse response, time-series data of the reproduced waveform for clock cycles is needed. The clock cycles are extracted from the reproduced waveform, in general, by using a PLL (phase-locked loop). In this procedure, data having a specified length and a time length for the circuit processing are needed, as well as the PLL circuit. In the present embodiment, the extraction of the clock cycles by using a PLL circuit is not conducted, and sampling of the reproduced waveform is conducted at a period less than the clock period (period shorter than the clock period). The time-series data of the reproduced waveform obtained by this sampling are fetched in the CPU, wherein time-series data of the reproduced waveform for the clock cycles are calculated by an interpolation technique from the input time-series data. The pulse response is derived from the time-series data of the reproduced waveform for the clock cycles thus obtained. Thereby, the PLL circuit is not needed to simplify the circuit configuration, and the time length for derivation of the pulse response can be reduced. In addition, even if the laser power is deviated from an optimum laser power to cause a malfunction of the PLL circuit, the data of the reproduced waveform for the clock cycles can be obtained. Thus, the linearity of the reproduced waveform can be evaluated.

It is to be noted that the rotational speed of the optical disk may be fluctuated by some external disturbance, to thereby cause a situation where the rotational speed differs between at the time of recording and at the time of reproducing. In such a case, due to the difference in the reference clock time between at the recording and at the reproducing, correct data cannot be obtained by the linear interpolation of the waveform data at the reproducing based on the clock time at the recording. However, even in this case, after assuming a plurality of clock times, the above "$\epsilon$", R1 and R2 are obtained by interpolating the waveform data for respective clock times thus assumed and then the minimum value for "$\epsilon$" or the maximum values for R1 and R2 are examined, whereby the linearity of the waveform can be evaluated together with calculating the correct clock time at the reproducing.

On the other hand, as the record mark length recorded on the disk is reduced along with development of a higher recording density, the signal amplitude of the reproduced waveform is reduced to cause a larger influence thereon by noise. This noise acts to provide a pulse response different from the inherent pulse response that the recording/reproducing system has, or provide an uncertainty to calculation of the pulse response. Therefore, the difference between the calculated result obtained by convolution processing of the pulse response and the record data and the reproduced waveform is either different from that in the case of the absence of noise, or uncertain, whereby the recording pule waveform selected is different from the waveform having the optimum recording strategy. The present inventor has found that, by iteratively recording a single recording pulse waveform for a plurality of times on the optical recording medium to form the record marks thereon and averaging a plurality of reproduced waveforms reproduced from these record marks, the influence by the random noise can be reduced to allow deriving of the recording pulse waveform having the optimum recording strategy, as will be detailed hereinafter.

As shown in FIG. 1, the recording/reproducing apparatus 1 according to the present embodiment includes an optical head 3 for irradiating an optical disk 2 with laser light, an LD driver 4 provided as a driver for changing the intensity of the laser light, and a CPU 5 provided as a control section. The CPU 5 has functions of allowing the LD driver 4 and the optical head 3 to convert the record data into a variety of recording pulse waveforms to form record marks on the optical disk, allowing the optical head to reproduce the record mark information on the optical disk to obtain reproduced waveforms, deriving pulse responses from the reproduced waveforms reproduced from the recording pulse waveforms, adjusting the recording pulse waveform so as to minimize the difference between the waveform obtained by convolution of the pulse responses and the record data and the reproduced waveform, to thereby obtain an optimum recording waveform, and averaging reproduced waveforms. These functions are implemented by software stored in the CPU 5.

The record data used for determining the recording strategy may be obtained by suitably modulating the typical random data such as M-sequential data, for example. It is sufficient that the record data have a length of around 200 bits in order to accurately derive the pulse response.

The averaging processing of the reproduced waveforms may be such that record marks recorded on a single track are reproduced for a plurality of times and the resultant reproduced waveforms are averaged. However, for reducing the time length for the data acquisition, it is more preferable that a plurality of iterated patterns having the same recording pulse waveform be recorded on a single track, and be reproduced therefrom and subjected to an averaging processing. If the recording area is too long, the signal amplitude may be fluctuated even in the circumference of the single track, to thereby cause a difficulty in an accurate averaging processing. To the contrary, since the record data used in the present embodiment has a data length of around 200 bits at most, the occupied area thereof is only a small part of the circumference of the single track, not to cause a fluctuation of the signal amplitude, assuming that a single bit length is 0.5 μm and, for example, and 10-time iterated patterns are used therein.

Figure 2:
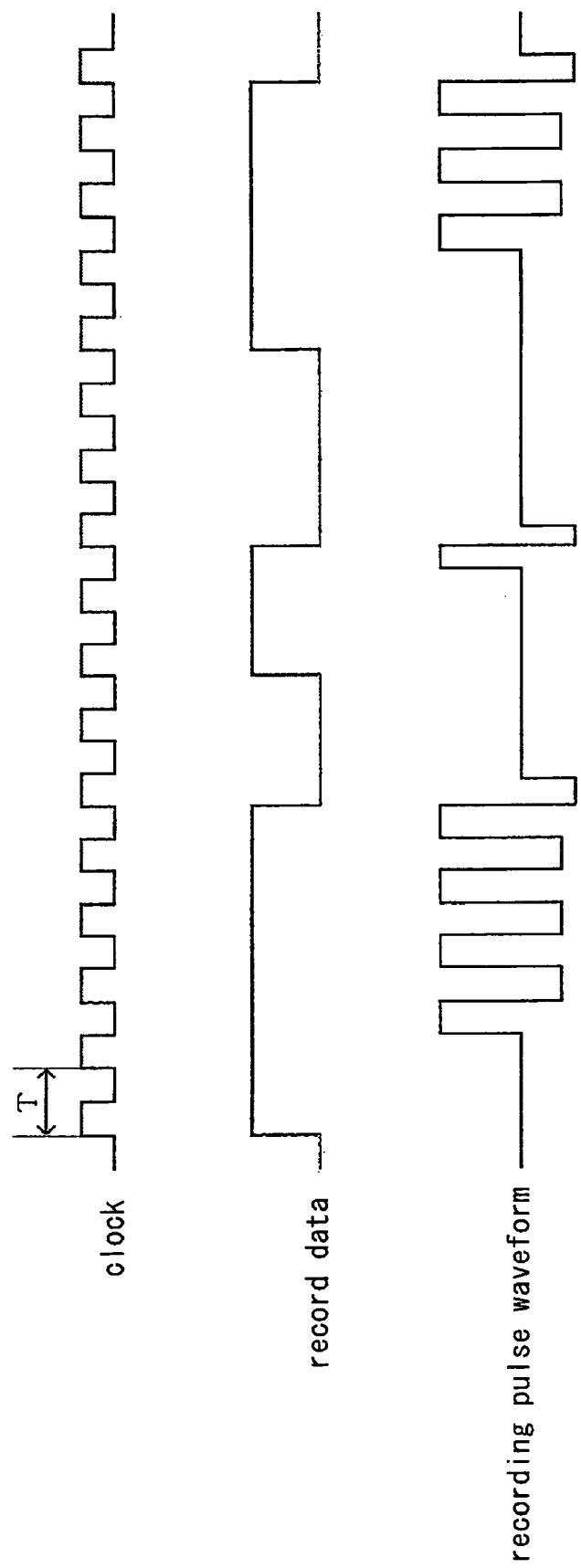
FIG. 2 is a timing chart showing the waveforms of the record data and recording pulses used for recording in the optical-information recording apparatus of FIG. 1.

FIG. 2 shows part of the record data and the recording pulse waveform together with the clock signal. T is the clock period. The recording pulse waveform having an optimum recording strategy is derived in the process as described hereinafter. First, a recording pulse waveform is recorded on the optical disk by using laser light from the optical head to form record marks, the information of which is read out to generate the reproduced waveform. The reproduced waveform thus reproduced is sampled at a period not longer than the clock period, and received in the CPU.

Figure 3:
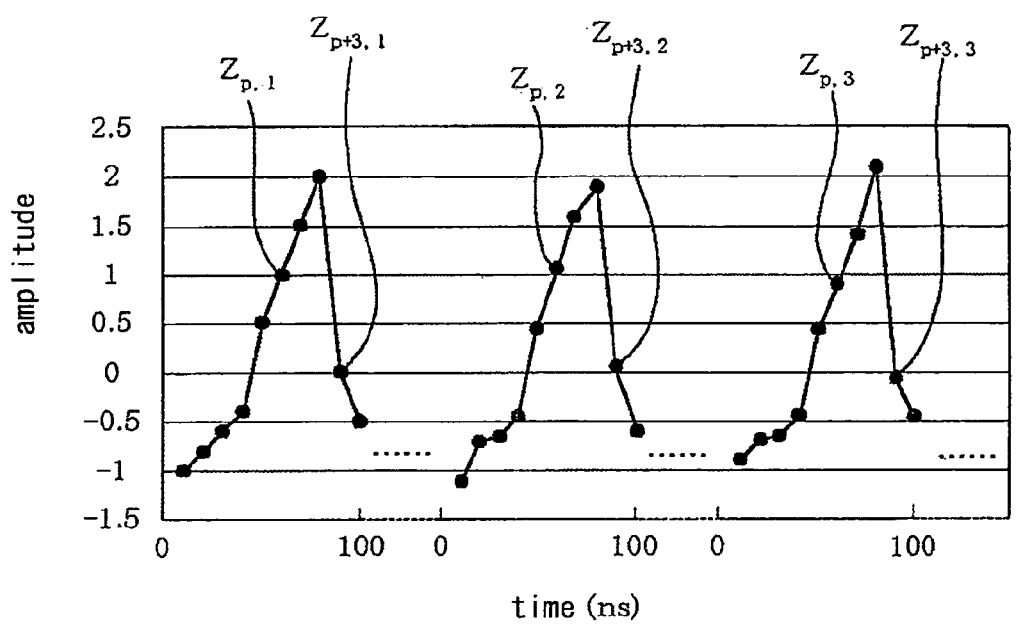
FIG. 3 is a timing chart showing the iteratively reproduced waveforms received in the CPU of the optical-information recording apparatus of FIG. 1.

FIG. 3 shows parts of the reproduced waveforms reproduced after the recording pulse waveform of FIG. 2 is iteratively recorded on a single track for three times. In FIG. 3, for a simplification purpose of the drawing, only a pulse of the reproduced waveform corresponding to the record data portion of first 5T length of the record data of FIG. 2 is shown for each of the iterations. The $z_{p,1}, \ldots, z_{p+3,1}$, $z_{p,2}, \ldots, z_{p+3,2}$, and $z_{p,3}, \ldots, z_{p+3,3}$ are time-series data of the reproduced waveform for each of the iterations. Here, the first suffix of z represents the order of sampling for each of the iterations, whereas the second suffix of z represents the number of iterated times. Subsequently, the three data, $z_{p,1}, \ldots, z_{p+3,1}, z_{p,2}, \ldots, z_{p+3,2}$, and $z_{p,3}, \ldots, z_{p+3,3}$, of the reproduced waveforms for the same value of p are averaged to obtain time series data, $\ldots, z_p, \ldots, z_{p+3}, \ldots$, of the averaged reproduced waveform.

Figure 4:
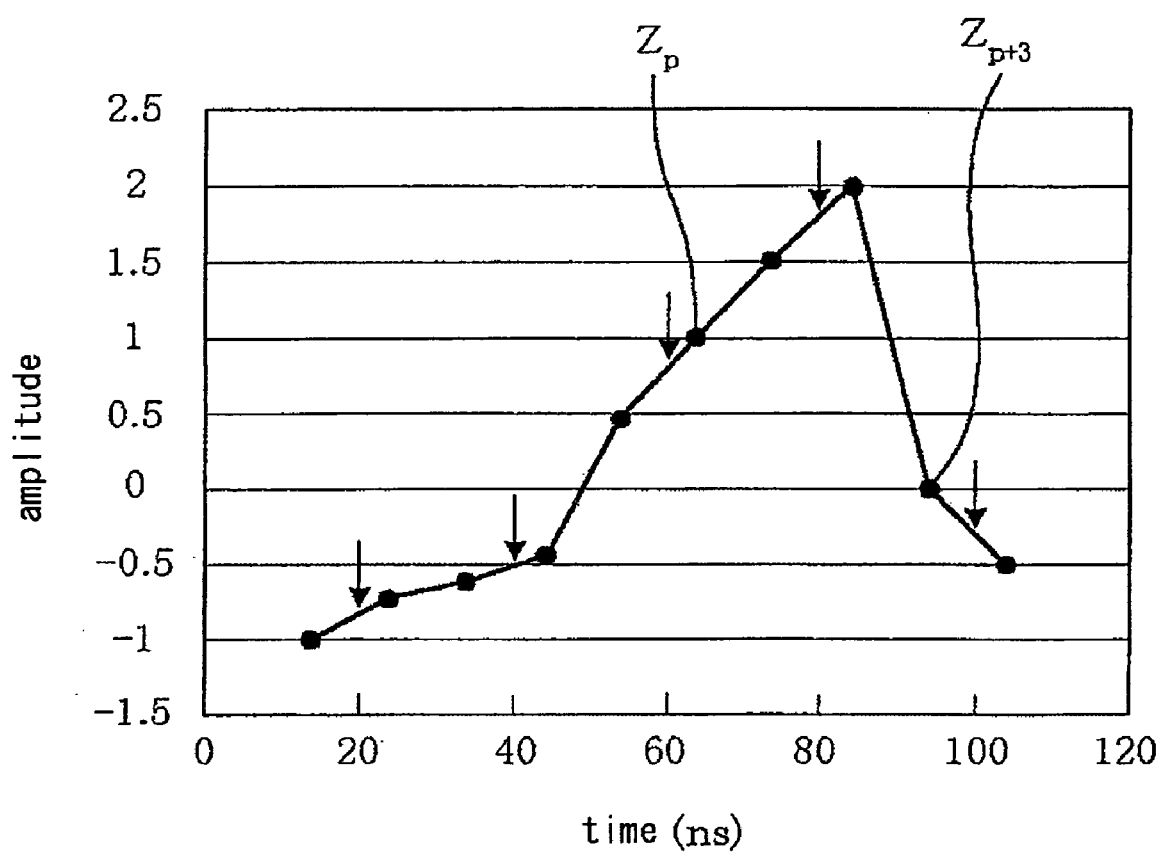
FIG. 4 is a timing chart of the waveform obtained by averaging the iteratively reproduced waveforms shown in FIG. 3.

FIG. 4 shows the time-series data $\ldots z_p \ldots$ of the averaged reproduced waveform as obtained above by plotting the same with dots. Subsequently, time-series data $y_k$ at the transition between "0" and "1" of the clock signal are obtained by interpolating the preceding and succeeding time-series data $z_p$. The points indicated by the downward arrows in FIG. 4 mean the points of the interpolation for providing the $y_k$. For performing the interpolation with ease, for example, a reference pulse should be added to the top of the record data, for example, and it is sufficient that, upon the reproducing, the time-series data be extracted by using the reproduced signal from the reference mark recorded by the reference pulse, as the start point. The k is an integer satisfying $0 \leq k \leq n$, wherein n is an integer not smaller than zero. The number of all the time-series data $y_k$ is (n+1). Here, it is assumed that $\epsilon$ is defined by the formula (3) described above.

$$\varepsilon = \sum_l \left( y_k - \sum_i a_{k-i} \times h_i \right)^2 \qquad (3)$$

wherein "i" is an integer satisfying $0 \leq i \leq k$.

Here, $a_{k-i}$ is record data. If the time-series data $h_i$ providing a minimum for $\epsilon$ is obtained by, for example, using a least-squares method or solving the partial differential equation $\partial \epsilon / \partial h_i = 0$, the resultant time-series data $h_i$ provide time-series data of the pulse response "h" of the recording/reproducing system with a higher-accuracy, depending on the maximum of k, i.e., number of the time-series data $y_k$. The range within which the time-series data $h_i$ of the pulse response "h" assumes a non-zero finite value is generally around i=2 to 20, depending on the circuit characteristic, optical head characteristic, recording density etc. of the recording/reproducing system, and for "i" above such a range, $h_i$ may be practically assumed as zero. Therefore, it is sufficient that the number of summation for the "i" be about twenty at most.

Subsequently, by performing the above steps while changing the recording strategy, the time-series data of the pulse response and the minimum of $\epsilon$ for that case are obtained. The recording strategy providing the least value among the minimums of $\epsilon$, which are obtained by consecutively changing the recording strategy similarly, is the optimum recording strategy. The fact that $\epsilon$ is small means that the linearity between the record data and the reproduced waveform data is high, and thus means that a reproduced waveform near the reproduced waveform expected by the mark edge recording scheme can be obtained. Although it is desired that the value of $\epsilon$ be zero in an ideal case, the perfect zero for the $\epsilon$ value is difficult to achieve due to the influence by noise, such as disk noise, laser noise, circuit noise etc., on the reproduced waveform. Thus, the recording strategy providing the least value for $\epsilon$ among the strategies thus changed may be called the optimum recording strategy.

As an index of the optimization of the recording strategy, each of R1 and R2 defined by the formulas (4) and (5):

$$R1 = (n+1) \times \frac{\sum_i h_i^2}{\sum_k \left(y_k - \sum_i a_{k-1} \times h_i\right)^2}; \quad \text{and} \tag{4}$$

$$R2 = \frac{\sum_k y_k^2}{\sum_k \left(y_k - \sum_i a_{k-1} \times h_i\right)^2}, \tag{5}$$

as well as each of I1 and I2 defined by the following formulas (6) and (7):

$$I1 = 10 \times \log R1 \tag{6}$$

$$I2 = 10 \times \log R2 \tag{7}$$

may be used instead of $\epsilon$.

As apparent from the formulas (4) and (5), the index R (R1 or R2) is the reciprocal of the normalized index $\epsilon$ normalized using the information obtained from the reproduced waveform. The index I (I1, I2) is the logarithmic expression of the index R (R1, R2). Although the optimization of the recording strategy is performed by adjusting the pulse width or pulse interval of the recording pulse waveform, the total sum of the squares of the time-series data $y_k$ of the reproduced waveform is not significantly changed by changing these pulse width and pulse interval to some extent. More specifically, the absolute value of $y_k$ assumes a larger value only for the case of a long mark or a long space, and the adjustment of the recording strategy is needed mainly for the case of a short mark or a short space. Thus, the maximum of R or I, if used instead of the minimum of $\epsilon$, scarcely affects the results. This provides an advantage that R and I are dimensionless amounts independent of the gain, reproducing power etc. of the reproducing circuit, differently from the $\epsilon$ having a unit corresponding to the square of the signal amplitude to change its amount depending on the gain, reproducing power etc. of the reproducing circuit.

On the other hand, in consideration of the adjustment of the laser power used for recording information, since the signal amplitude changes with the change of the recording power, the deviation from the linearity should be normalized in some way. More specifically, since it is considered that a smaller recording power may involve the case wherein the absolute vale of $\epsilon$ is smaller and the signal amplitude itself is extremely small, there is a possibility that the laser power providing the minimum value for $\epsilon$ does not necessarily coincide with the optimum laser power. The present inventor found that the above R1 or R2 (or, I1 or I2) may be used as the index of normalizing $\epsilon$ for adjusting the laser power. R1 uses the energy of the pulse response multiplied by the bit number evaluated therefor as the normalized signal amplitude, whereas R2 uses the total sum of the energy of the reproduced waveform as the normalized signal amplitude.

Any of the indexes R1 and R2 may be used for adjusting the laser power. Since the energy of the reproduced waveform used in R2 includes noise component or nonlinear component as it is, adjustment of the laser power may be considered difficult to achieve in the case where chromatic noise is extremely high or the reproduced waveform has a considerable non-linearity. For this reason, R1 using only a linear component as the signal energy is more preferable. In stead of R1, R3 defined by the following formula (8):

$$R3 = (n+1) \times \frac{h_{i\_max}^2}{\sum_k \left(y_k - \sum_i a_{k-1} \times h_i\right)^2} \tag{8}$$

may be used. The R3 represents the energy of the pulse response by the square of the amplitude. In the formula (8), $h_{i\_max}$ represents the amplitude of the pulse response. As the index of adjusting the recording condition, R3 may be used as it is, or in the form of I3, which is the logarithm of R3, similarly to I1 and I2.

Upon adjusting the laser power, the iterative recording of the same record data need not be necessarily performed for an average processing. This is because, if the laser power deviates from the optimum laser power in the case of adjusting the laser power for the overwrite operation on the phase-change optical disk, for example, then the un-erased component of the preceding data existing before the overwrite operation is dominant over the noise, which fact enables a linear evaluation of the waveform without the need for suppressing the noise component.

EXAMPLE 1

Figure 5:
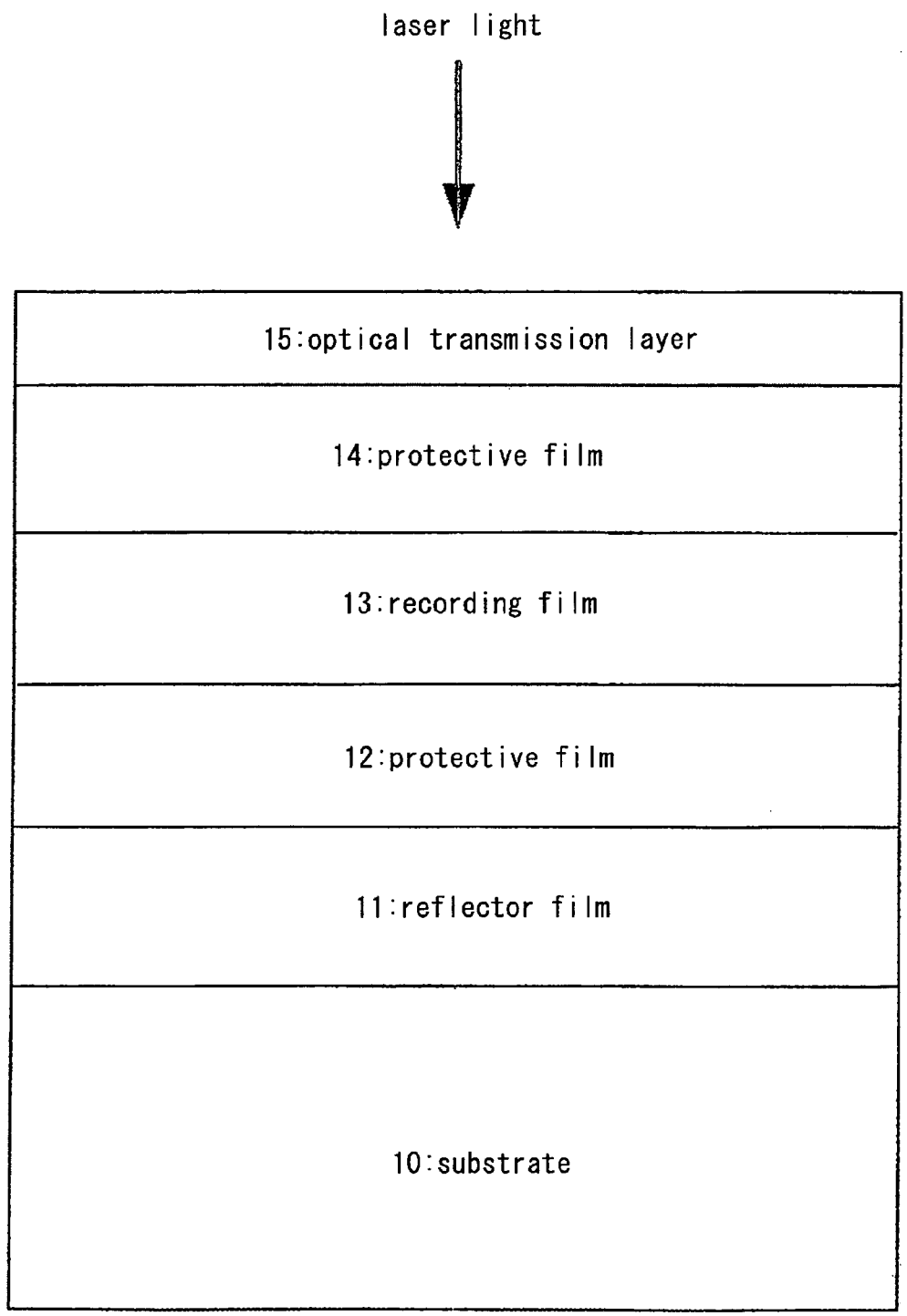
FIG. 5 is a sectional view of an example of the optical disk used for recording in the optical-information recording apparatus of FIG. 1.

FIG. 5 is a sectional view of an optical disk used in Example 1 according to the embodiment of the present invention. As depicted in FIG. 5, the optical disk used in this example includes reflector film 11, protective film 12, recording film 13, protective film 14 and optical transmission film 15, which are layered in this order on a plastic substrate 10. The recording film 13 is formed as a phase-change recording medium. The plastic substrate 10 is made of polycarbonate, and the pitch of the guide grooves thereof is 0.32 μm. The optical head of the present example has a laser wavelength of 400 nm and a NA (numerical aperture) value of 0.85.

Figure 6:
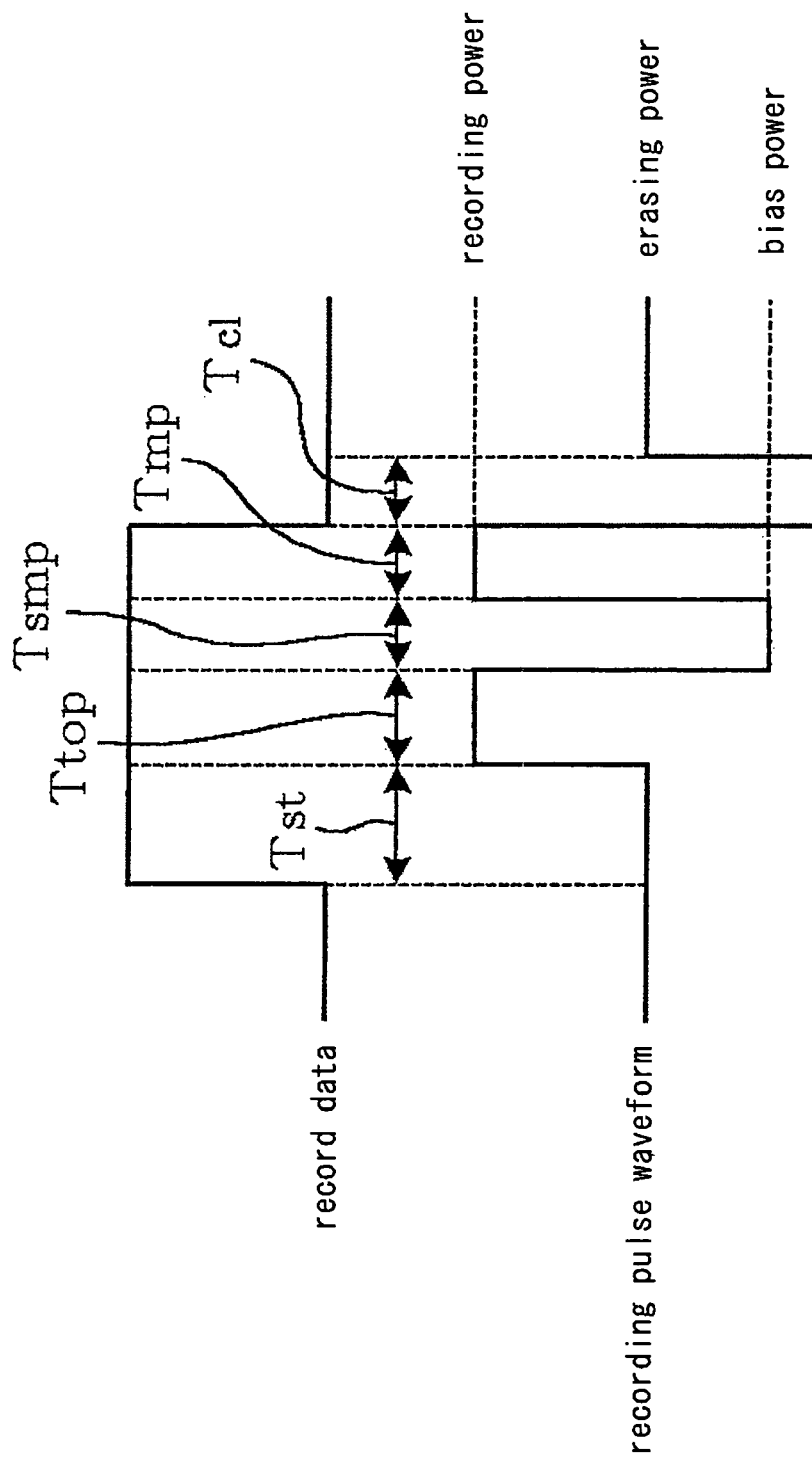
FIG. 6 is a timing chart showing the waveforms of the record data and recording pulse, explaining optimization of the recording strategy in a first example of the present invention.
Figure 7:
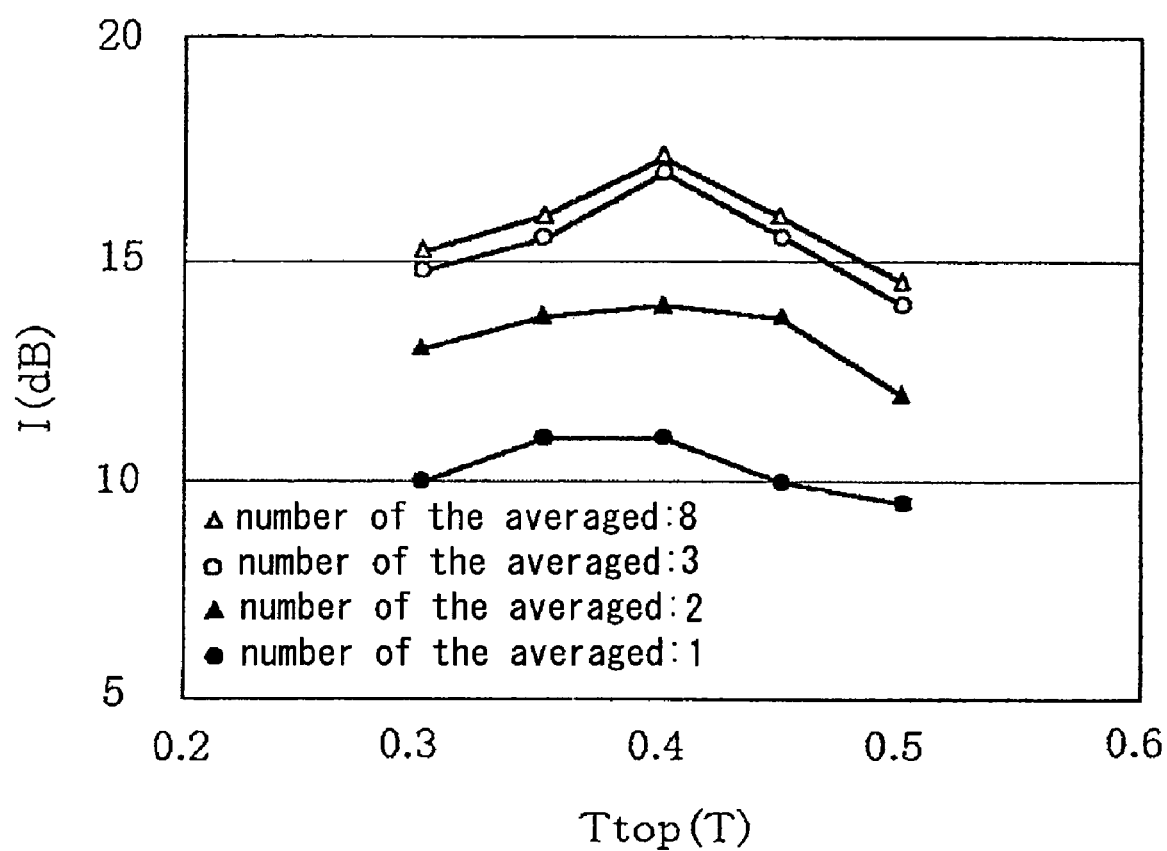
FIG. 7 is a graph showing the relationship between the top pulse width of the recording pulse waveform shown in FIG. 6 and an index I (I2).
Figure 8:
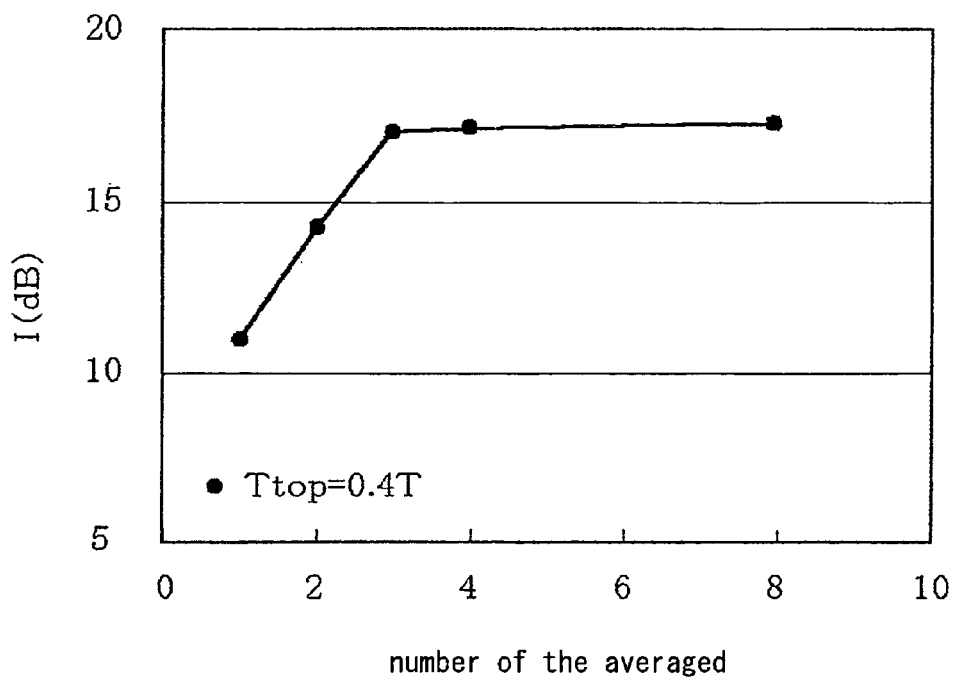
FIG. 8 is a graph showing the relationship between the number of iteration times of the recording pulse waveform shown in FIG. 6 and the index I (I2).
Figure 9:
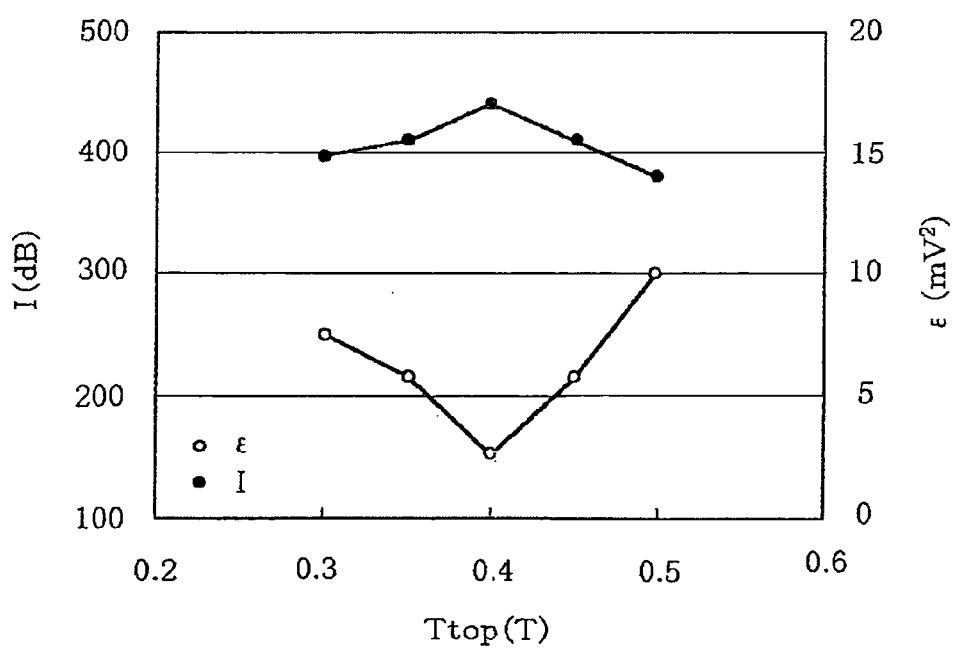
FIG. 9 is a graph showing the relationship between the top pulse width of the recording pulse waveform shown in FIG. 6 and the index I (I2) and between the pulse width and $\epsilon$.
Figure 10:
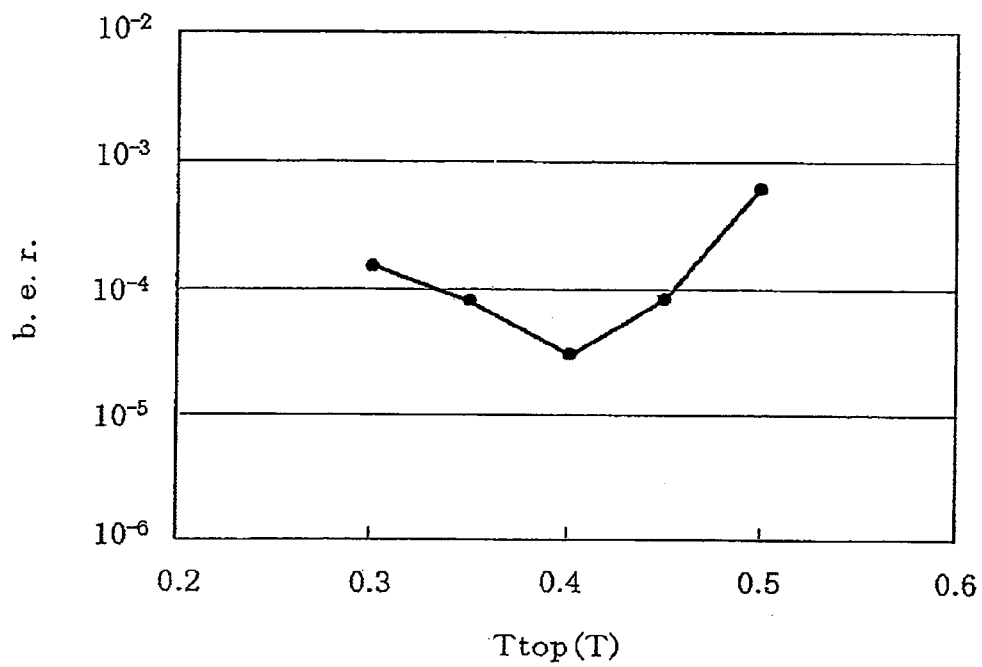
FIG. 10 is a graph showing the relationship between the top pulse width of the recording pulse waveform shown in FIG. 6 and the bit error rate.

FIG. 6 shows parts of the recording signal and recording pulse waveforms, explaining optimization of the recording strategy in Example 1. FIG. 7 is a characteristic chart showing the relationship between the top pulse width of the recording pulse waveform of FIG. 6 and the index I2. FIG. 8 is a characteristic chart showing the relationship between the number of iteration times (number of average times) of the recording pulse waveform of FIG. 6 and the index I2. FIG. 9 is a characteristic chart showing the relationship between the top pulse width of the recording pulse waveform of FIG. 6 and the index I2 as well as the relationship between the top pulse width and ε. FIG. 10 is a characteristic chart showing the relationship between the top pulse width of the recording pulse waveform of FIG. 6 and the bit error rate.

Recording was performed on the optical disk at a clock frequency of 90 MHz while rotating the disk at a linear speed of 5.5 m/s. The laser light from the optical head was incident from the optical transmission film side of the optical disk, whereby record marks were formed on a land portion between guide grooves. The recording power and erasing power were 4 mW and 1.5 mW, respectively. The diameter of the optical beam on the optical disk was 0.4 μm. In addition, for adapting to the mark edge recording scheme, M-series pseudorandom data having a length of 200 bits as described above were converted to 1-7 RLL (run length limited), followed by NRZI (NonReturn-to-Zero-Inverted) modulation-encoding to generate record data. In this case, seven kinds of record marks (hereinafter referred to as "2T record mark" to "8T record mark") having lengths of 2T to 8T in terms of reproduced time length were formed on the disk, wherein the shortest record mark had a length of 0.12 μm. T is the clock period, wherein T=11.11 ns in this example. The extraction of the reproduced waveform was conducted every 10 ns.

The measurement of the b.e.r. was performed by recording and reproducing M-series pseudo-random data having a length of $10^6$ bits for each strategy.

FIG. 6 shows the record data having a pulse width of 3T and the recording pulse waveform corresponding thereto, for explaining the recording strategy. Hereinafter, the recording pulse waveform corresponding to the record data having a pulse width of 3T is referred to as a 3T signal. The recording pulse waveform corresponding to the record data having another length is similarly referred to. As shown in FIG. 6, the recording pulse waveform is a pulse signal including, succeeding to the zone Tst of an erasing power level: a top pulse having a recording power level and a pulse width of Ttop; a multi-pulse section including a low-level pulse having a pulse width of Tsmp and a bias power level, and a high-level pulse having a pulse width of Tmp and a recording power level; and a cooling section having a pulse width of Tcl. Although a laser power of around 0.1 to 0.5 mW generally exists in the cooling pulse, even a complete zero laser power scarcely affects the results to be obtained. The zone Tst and the pulse widths Ttop, Tsmp, Tmp, Tcl may be used as recording compensation parameters for optimizing the recording strategy.

Among the adjustments of those recording compensating parameters, adjustments of the recording compensating parameters of 2T signal and 3T signal are especially needed in the high-density recording condition. The recording compensating parameters of 4T signal to 8T signal are not necessarily adjusted for each of these signals: for example, if the 4T signal is optimized, other signals can be optimized by increasing or reducing the number of pulses in the multi-pulse section.

Hereinafter, by exemplifying the 3T signal, the step of optimizing the recording strategy by changing the pulse width Ttop of the top pulse thereof will be described. Table 1 shows each parameter used in the present example. In the present example, only the preceding duration Tst before starting the top pulse of the 3T signal and the pulse width Ttop of the top pulse are changed, with the recording compensation parameters of the 2T signal and 4T to 8T signals being fixed. In Table 1, the number of pairs each including the low-level pulse having a pulse width of Tsmp and the high-level pulse having a pulse width of Tmp in the multi-pulse section is increased one by one from the 3T signal toward the 8T signal, such as two pairs in the 4T signal, three pairs in the 5T signal, . . . .

TABLE 1

|  | Tst | Ttop | Tsmp | Tmp | Tcl |
| --- | --- | --- | --- | --- | --- |
| 2T | 1.65T | 0.35T |  |  | 0.3T |
| 3T | 2T–Ttop | 0.3T–0.5T | 0.5T | 0.5T | 0.4T |
| 4T–8T | 0.5T | 0.5T | 0.5T | 0.5T | 0.4T |

First, the record data generated as above are converted into the recording pulse waveform having a configuration such as shown in FIG. 2, followed by recording 8-time-iterated patterns of the recording pulse waveform on the optical disk and then examining the number of averaging processings needed for optimizing the recording strategy. During this procedure, a 10T reference mark was recorded at the top of each recording pulse waveform for each of iterations of the recording pulse waveform, and time series data of the reproduced waveform were fetched using the reproduced waveform from the 10T reference mark as the starting point. This procedure was employed for improving the positioning accuracy for the data extraction. It is to be noted that the length of the reference mark or space used for the starting point is not limited to a length of 10T, and it is sufficient that the length be stably detectable (preferably longer than the diameter of the optical beam) and it have a pattern not used for the record data.

FIG. 7 shows the index I2 plotted while changing the pulse width Ttop of the top pulse of the 3T signal from 0.3T to 0.5T. In FIG. 7, the four curves are obtained by averaging one, two, three and eight among the eight iteratively recorded pulse waveforms. As shown in FIG. 7, for the case of averaging processing wherein the number of the averaged is one (no averaging processing) or two, the value for the index I2 is small due to the influence by noise, and also the change of the index I2 along with the change of the pulse width Ttop of the top pulse constituting the recording compensation parameter for the optimization of the recording strategy is not clear. Therefore, it is difficult to determine the optimum recording strategy by using the averaging processing wherein the number of the averaged is two or less. For the averaging processing wherein the number of the averaged is three or more, the index I2 has a larger value, and the change of the index I2 along with the change of the pulse width Ttop of the top pulse is clear.

In addition, in the averaging processing wherein the number of the averaged is three or more, the value of the index I2 scarcely depends on the number of the averaged. FIG. 8 shows the index I2 plotted against the number of the averaged in the 3T signal wherein the pulse width Ttop of the top pulse is 0.4T. As shown in FIG. 8, the index I2 changes in the averaging processing wherein the number of the averaged is two or less, whereas the index I2 is substantially fixed in the averaging processing wherein the number of averaged is three or more. Accordingly, the influence by noise is substantially completely removed by the averaging processing wherein the number of the averaged is three or more.

FIG. 9 shows the indexes I2 and ε plotted while changing the pulse width Ttop of the top pulse of the 3T signal from 0.3T to 0.5T. The values for the indexes I2 and ε were obtained by averaging the 3-time-iterated patterns of the recording pulse waveform. As shown in FIG. 9, when the pulse widths Ttop of the top pulses are all 0.4T, the index I2 assumes a maximum and the index ε assumes a minimum. This means the index I2 can be properly used instead of the index ε.

FIG. 10 shows the bit error rate b.e.r. plotted while changing the pulse width Ttop of the top pulse of the 3T signal from 0.3T to 0.5T. The value for the bit error rate were obtained by averaging 3-times-iterated patterns of the recording pulse waveform. As shown in FIG. 10, the bit error rate assumes a minimum when the pulse width Ttop of the top pulse is 0.4T. This pulse width 0.4T of the top pulse is equal to the pulse width 0.4T of the top pulse at which the index I2 of FIG. 7 assumes a maximum.

EXAMPLE 2

Figure 11:
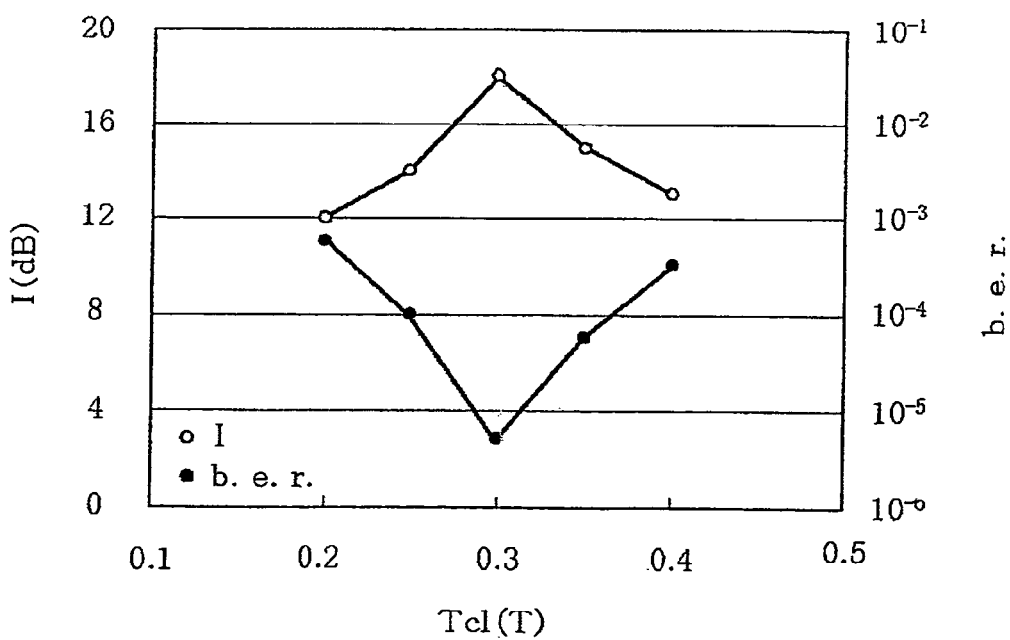
FIG. 11 is a graph showing the relationship between the cooling pulse width of the recording pulse and the index I (I2), and the relationship between the pulse width and the bit error rate in a second example.

FIG. 11 is a characteristic chart showing the relationship between the pulse width of the cooling section of the recording pulse waveform and the index I2 as well as the relationship between the pulse width and the bit error rate, explaining optimization of the recording strategy in Example 2 of the present invention.

Recording was performed on the optical disk at a clock frequency of 70 MHz while rotating the disk at a linear speed of 5.5 m/s. The recording power and erasing power were 4 mW and 1.5 mW, respectively. The diameter of the optical beam on the optical disk was 0.4 μm. The record data used for adjusting the strategy and measuring the b.e.r. were similar to those used in Example 1 except that the clock frequency was changed. In this case, 2T to 8T record marks were formed on the disk, similarly to Example 1, with the shortest record mark being 0.16 μm long. The clock period T was T=14.29 ns. The sampling of the reproduced waveform was conducted every 10 ns.

In the present example, the pulse width Tcl of the cooling section in the 2T signal was selected as the recording compensation parameter to be adjusted. Table 2 shows each parameter used in the present example. In the present example, only the pulse width Tcl in the 2T signal was changed from 0.2T to 0.4T, with the recording compensation parameters in the 3T to 8T signals being fixed. In Table 2, the number of pulse pairs in the multi-pulse section is one in the 3T signal, and the number of pairs is increased one by one from the 3T signal to the 8T signal.

TABLE 1

|  | Tst | Ttop | Tsmp | Tmp | Tcl |
|---|---|---|---|---|---|
| 2T | 1.65T | 0.35T |  |  | 0.2T–0.4T |
| 3T | 1.6T | 0.4T | 0.5T | 0.5T | 0.4T |
| 4T–8T | 1.5T | 0.5T | 0.5T | 0.5T | 0.4T |

The number of iteration times of the recording pulse waveform was three, and the index I2 and bit error rate b.e.r. were calculated from the averaged values of the 3-time-iterated patterns. FIG. 11 shows the index I2 and bit error rate thus obtained, which are plotted against the pulse width Tcl of the cooling section in the 2T signal. As shown in FIG. 11, 0.3T is optimum as the pulse width Tcl of the cooling section in the 2T signal.

Although the data for I2 is described herein as the representative of a linear and normalized index in the Example 1 and Example 2, I1 or I3 also has the strategy dependence similarly to I2, and it was confirmed that optimization of the strategy was possible using I1 or I3.

EXAMPLE 3

A phase-change optical disk, wherein protective film, recording film, protective film and reflector film were consecutively layered on a 0.6-mm-thick plastic substrate and a ultraviolet-ray-cured resin layer was formed on the reflector film, was used to investigate the relationship between the laser power and I1, I2 and I3. The recording film was made of a phase-change recording medium. Polycarbonate was used as the plastic substrate, wherein the pitch of guide grooves was 0.42 μm. In addition, the laser wavelength of the optical head was 405 nm, and the NA value thereof was 0.65.

Recording was performed on the optical disk at a clock frequency of 60 MHz while rotating the disk at a linear speed of 5.2 m/s. The recording was performed while changing the laser power, with the ratio of the recording power to the erasing power being at 2.4. The diameter of the optical beam on the optical disk was 0.52 μm. As for the record data, the data used for adjusting the laser power were random data having a length of 200 bits similarly to Example 1, whereas the record data used for measuring the b.e.r. was record data having a length of $10^6$ similarly to Example 1, wherein only the clock frequency was changed. In this procedure, 2T to 8T record marks were formed similarly to Example 1, although the shortest record mark had a length of 0.17 μm. The clock period T was T=16.66 ns. The reproduced waveform was fetched at every 15 ns.

Figure 12:
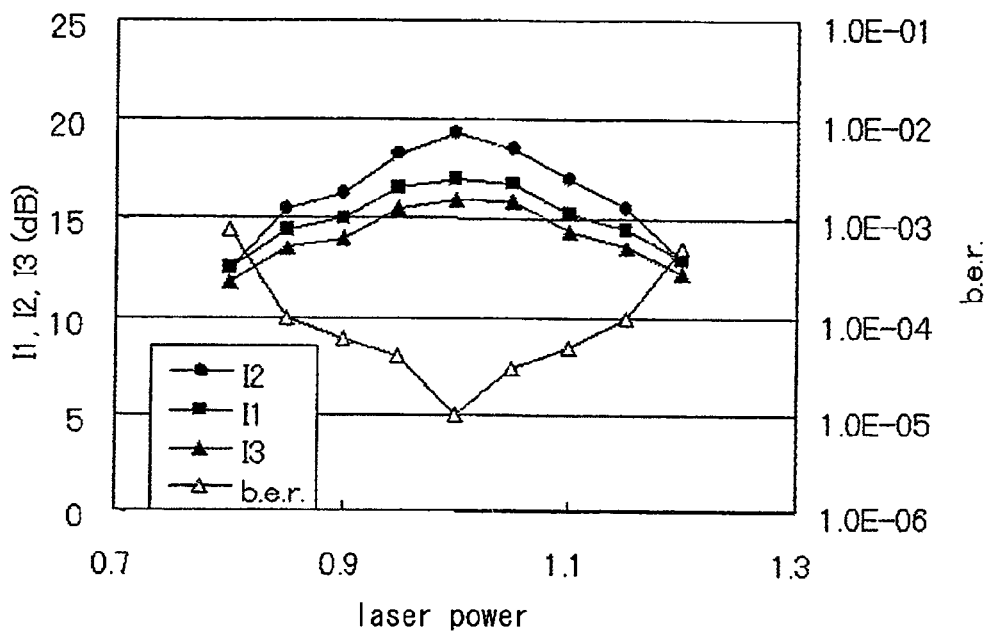
FIG. 12 is a graph showing the relationship between the laser power and the index I (I1, I2, I3) and the relationship between the laser power and the bit error rate.

The procedure of overwriting by each of the laser powers for ten times were conducted at the each of the laser powers, thereby obtaining the b.e.r., R1, R2 and R3 for the each condition. FIG. 12 shows the results thereof. In the present example, the averaging processing was not conducted. In the present example, the averaging processing scarcely improved the values for R1, R2 and R3. This was considered due to the fact that the linearity of the waveform was not white noise, and the remaining un-erased component of the preceding data existing before the overwrite operation dominated the linearity of the waveform.

The laser power shown in FIG. 12 is normalized, wherein the laser power corresponding to "1" means a recording power of 6 mW and an erasing power of 2.5 mW. Similarly, the laser power corresponding to "1.2" means a recording power of 7.2 mW and an erasing power of 3 mW. It is understood from FIG. 12 that the laser power providing a best value for the b.e.r. and the laser power providing maximum values for R1, R2 and R3 coincide with each other and thus the laser power can be effectively adjusted by examining the values for R1, R2 and R3 (logarithms I1, I2 and I3 of the respective values thereof are shown in FIG. 12) while changing the laser power.

Figure 13:
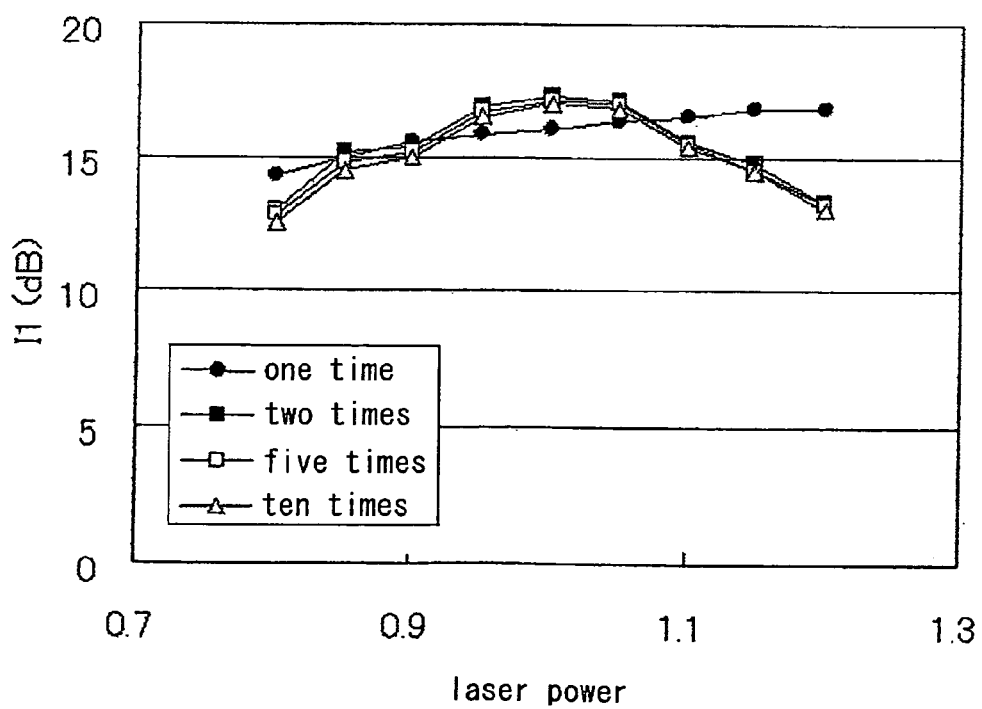
FIG. 13 is a graph showing the relationship between the laser power and the index I1 upon changing the number of overwrite times.

In addition, measurements were conducted using the above phase-change optical disk while changing the number of overwrite times for the each of the laser powers, thereby examining the relationship between the laser power and R1, R2 and R3 in the case of changing the number of overwrite times. FIG. 13 shows the results for I1 (R1) as the typical example. Again, in this measurement, the averaging processing was not conducted.

As understood from FIG. 13, the maximum value for I1 (R1) is difficult to find by one overwrite time (the first recording), and thus it is difficult to optimize the laser power. This is considered due to the fact that the first recording is not affected by the preceding record data at all, which inherently exists in the overwrite operation. More specifically, if the erasing laser power is inadequate, the remaining un-erased component of the preceding record data generally appears as the distorted component of the signal and thus the linearity of the waveform largely changes, whereas the remaining un-erased component of the preceding data does not exist in the first recording. Although the drawing does not specifically show, similar results were obtained as to R2 and R3. Therefore, for optimizing the laser power for the phase-change optical disk by examining the values for R1, R2 and R3, at least two overwrite times are necessary.

EXAMPLE 4

A phase-change optical disk, wherein protective film, recording film, protective film and reflector film were consecutively layered on a 0.6-mm-thick plastic substrate and a ultraviolet-ray-cured resin layer was formed on the reflector film, was used to investigate the relationship between the laser power and I1, I2 and I3. The recording film was as thick as 30 nm thick, and the reflector film was as thin as 10 nm thick, to obtain a disk configuration wherein the heat dissipation capability was low and the edge shift (nonlinear component) was large during the recording. Polycarbonate was used as the plastic substrate, wherein the pitch of guide grooves was 0.42 µm. In addition, the laser wavelength of the optical head was 405 nm, and the NA value thereof was 0.65.

Recording was performed on the optical disk at a clock frequency of 60 MHz while rotating the disk at a linear speed of 5.2 m/s. The recording was performed while changing the laser power, with the ratio of the recording power to the erasing power being at 2.4. The diameter of the optical beam on the optical disk was 0.52 µm. As for the record data, the record data were similar to those in Example 3, and only the clock frequency was changed. In this procedure, 2T to 8T marks were formed, although the shortest record mark had a length of 0.17 µm. The clock period T was T=16.66 ns. The reproduced waveform was fetched at every 15 ns.

Figure 15:
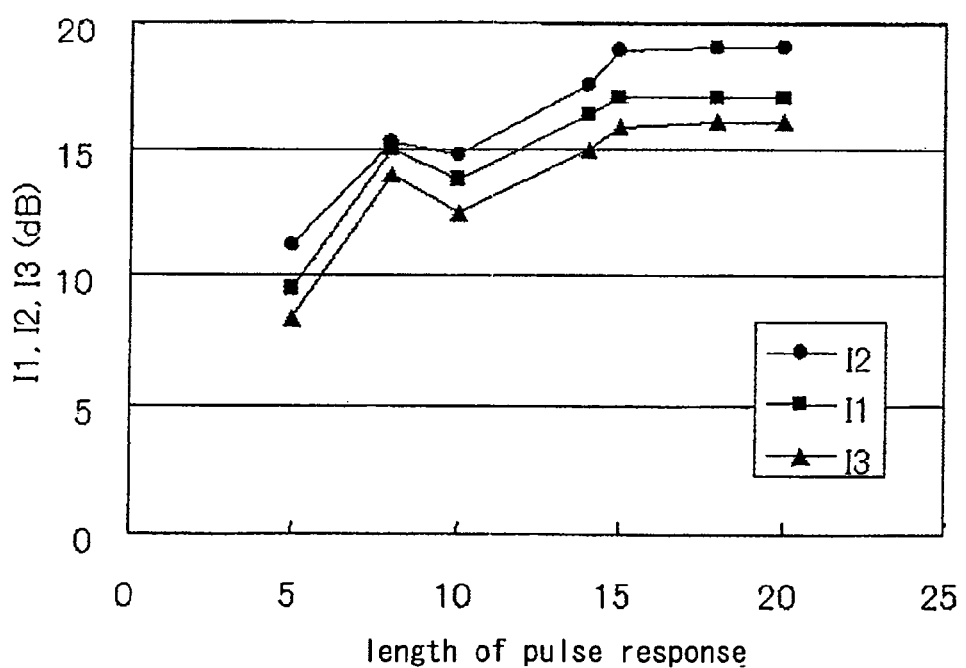
FIG. 15 is a graph showing the relationship between the length of the pulse response and the indexes (I1, I2 and I3).

The procedure of overwriting by each of the laser powers for ten times was conducted at the each of the laser powers, thereby obtaining the b.e.r., R1, R2 and R3 for the each condition. FIG. 15 shows the results thereof. In the present example, the averaging processing was not conducted.

Figure 14:
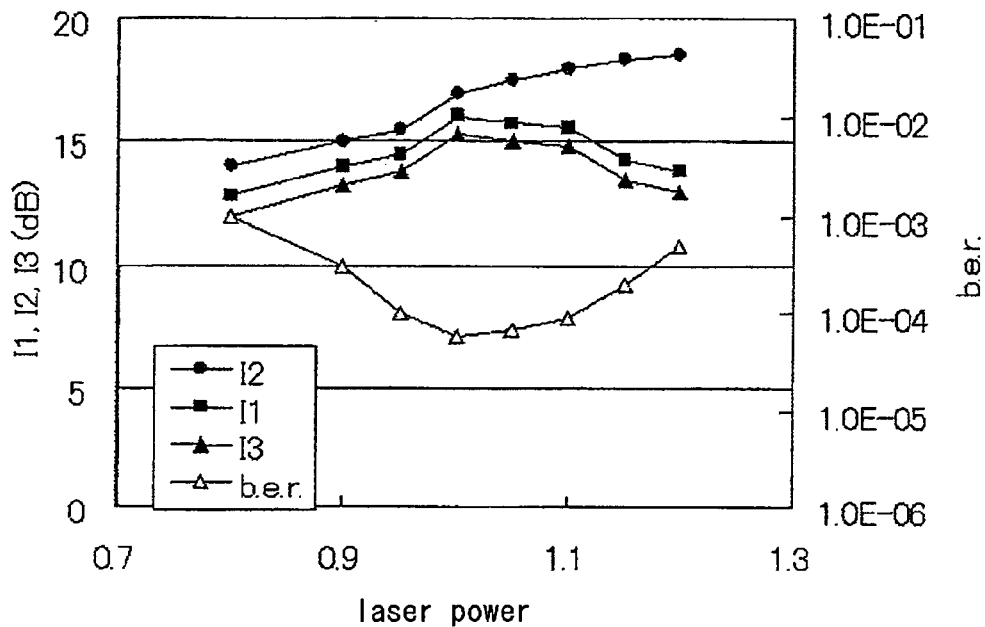
FIG. 14 is a graph showing the relationship between the laser power and indexes I (I1, I2, I3) and the relationship between the laser power and the bit error rate.

As understood from FIG. 14, although the laser power providing maximum values for R2 and R3 and the laser power providing a minimum value for the b.e.r. coincide with each other, as for R1, the laser power providing maximum value for R1 and the laser power providing a minimum value for the b.e.r. do not coincide with each other. This is considered due to the fact that although the edge shift is larger when the laser power is higher, the index of the linearity as to R1 is normalized by the signal component including the edge shift. Thus, for optimizing the laser power, it is more preferable to use R2 or R3.

EXAMPLE 5

The length of the pulse response to the reproduced waveform obtained in Example 3 was changed from 5T to 20T (T: channel clock) to obtain the values for I1, I2 and I3, thereby examining the relationship between the length of the pulse response and I1, I2 and I3. FIG. 15 shows the results thereof. It is to be noted that the data shown in FIG. 15 were obtained for the reproduced waveform data obtained for the laser power 1 in Example 3. As understood from FIG. 15, the case where I1, I2 and I3 assume approximately saturated values arises when the pulse response has a length of 15T or more, and if the length is smaller, the values largely vary so that the linearity cannot be evaluated with accuracy.

EXAMPLE 6

The data recorded in Example 3 were reproduced at a linear speed of 5.3 m/s, and data for I1, I2 and I3 were calculated while changing the clock period for the interpolation. Since the recording was performed at a linear speed of 5.2 m/s under the condition of clock period at 16.66 ns, as described in connection with Example 3, the reproduction at a linear speed of 5.3 m/s corresponds to an accurate clock period of 16.35 ns. After I1, I2 and I3 were calculated while changing the clock period for the interpolation of the reproduced waveform from 15 ns to 18 ns with a step of 0.05 ns, it was confirmed that I1, I2 and I3 assumed maximum values in the case where the clock period was assumed 16.35 ns. Accordingly, even if some external disturbance causes a fluctuation of the rotational speed of the optical disk to vary the rotational speed between the time of recording and the time of the reproducing, a correct clock period for the reproducing can be calculated along with the evaluation of the linearity of the waveform by assuming a plurality of clock periods and interpolating the waveform data in the assumed clock periods.

EXAMPLE 7

Figure 16:
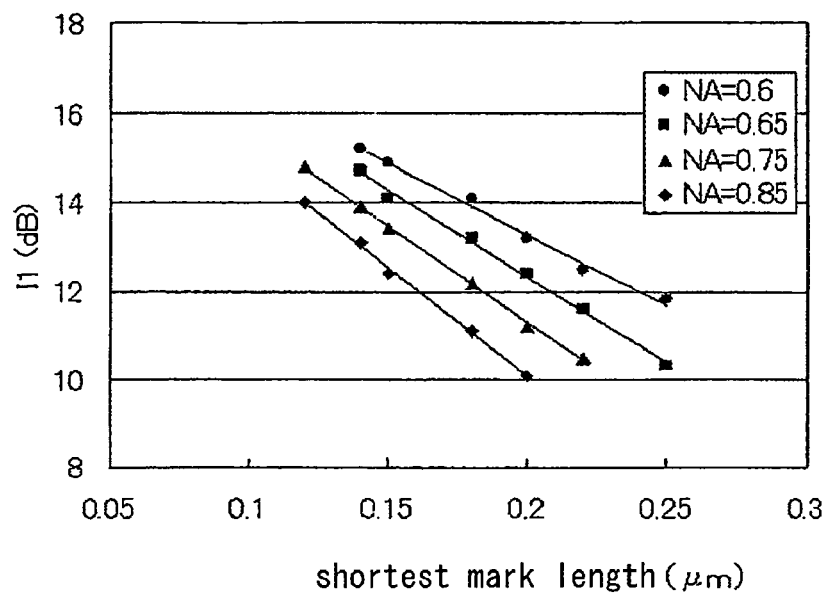
FIG. 16 is a graph showing the relationship between the index I1 for achieving the specified bit error rate and the shortest mark recorded on the disk.
Figure 17:
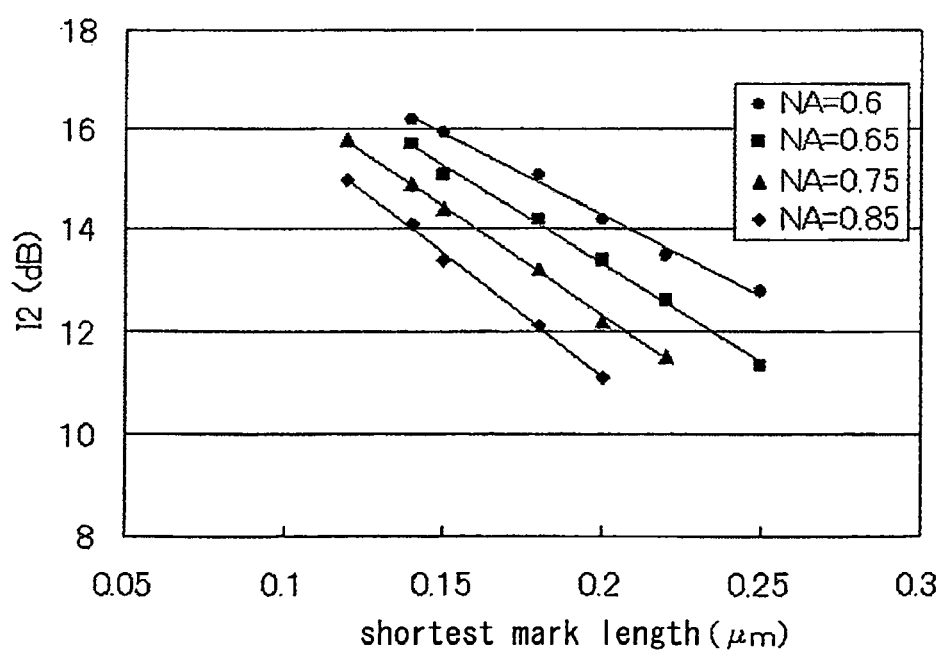
FIG. 17 is a graph showing the relationship between the index I2 for achieving the specified bit error rate and the shortest mark recorded on the disk.

FIGS. 16 and 17 show the characteristic charts between the shortest bit length and the index I1 and the shortest bit length and the index I2, respectively, which were obtained by optimizing the recording strategy in Example 2 of the present invention.

The phase-change optical disk used in Example 1 was rotated at a linear speed of 5.5 m/s while changing the clock frequency by using optical heads having a wavelength of 405 nm and having NA=0.8 and NA=0.75, to thereby conduct recording while changing the shortest record mark length recorded on the optical disk, whereby the relationship between the laser power and the b.e.r. was examined. Similarly, the phase-change optical disk used in Example 3 was rotated at a linear speed of 5.5 m/s while changing the clock frequency by using optical heads having a wavelength of 405 nm and having NA=0.65 and NA=0.6, to thereby conduct recording while changing the shortest record mark length recorded on the optical disk, whereby the relationship between the laser power and the b.e.r. was examined. The beam diameter was 0.6, 0.52, 0.46, and 0.4 mm in the cases of NA=0.6, 0.65, 0.75 and 0.85, respectively.

Upon changing the laser power, the ratio of the recording power to the erasing power was fixed, and the overwrite operation was conducted for 10 times for each of the laser powers during the change of the laser power, before I1, I2 and the b.e.r. were measured. As for the record data, data having a length of 200 bits was used, similarly to Example 1, to measure I1 and I2, and data having a length of $10^6$ bits similarly to Example 1 was used to measure the b.e.r. The shortest mark length was changed by changing the clock frequency.

In FIGS. 16 and 17, the indexes I1 and I2 providing a bit error rate of $1\times10^{-4}$ are plotted for each shortest record mark length L. The reason for employing a bit error rate of $1\times10^{-4}$ as a reference is that the maximum of the bit error rate within which the error correction is possible (the system operates without a malfunction) by using an error correction such as a reed solomon is generally $1\times10^{-4}$. The index I (I1, I2) is approximately on a straight line, and the area of the sheet above the straight line, a boundary, corresponds to the area of the index I which provides a bit error rate of $1\times10^{-4}$ or less. More specifically, if the condition where $I1\geq20-aL$ and $I2\geq21-aL$ is satisfied, then the bit error rate is not higher than $1\times10^{-4}$. It is also understood that the value for "a" becomes smaller as the beam diameter becomes larger. Thus, the relationship between the value for "a" and the beam diameter was examined, to reveal that "a" was in inverse proportion to the beam diameter, and that the straight lines in FIGS. 16 and 17 were approximated by $I1=20-20(L/w)$ and $I2=21-20(L/w)$, respectively. That is, if the condition where $I1=20-20(L/w)$ and $I2=21-20(L/w)$ are satisfied, the bit error rate will be not higher than $1\times10^{-4}$. Thus, adjustment of the laser power so as to satisfy this condition provides a bit error rate of not more than $1\times10^{-4}$.

In the recording process and the recording apparatus for the optical information, according to the present embodiment as described above, the recording condition is optimized by determining the pulse response so as to minimize the difference between the reproduced waveform obtained by recording and reproducing the recording pulse signal obtained by recording strategy processing of the record data and the waveform obtained by convolution processing of the record data and the pulse response. Upon the optimization, since the recording condition is optimized by sampling the reproduced waveform at a period shorter than the clock period, the recording strategy is optimized within a short period of time without using a complicated circuit configuration.

In addition, since the clock period is not extracted by using a PLL, the linearity of the reproduced waveform can be evaluated even in the case where the laser power deviates from the optimum laser power to cause a malfunction of the PLL.

Further, since the same recording pulse waveform is recorded for three times or more on a single track of the optical disk, and the reproduced waveforms reproduced therefrom are averaged and used as a reproduced waveform, the recording strategy can be optimized without an influence by noise even in the case of a high recording density.

Further, upon optimizing the laser power by determining the pulse response so as to minimize the difference between the reproduced waveform obtained by recording and reproducing the recording pulse signal on the optical disk and the waveform obtained by the convolution processing of the record data and the pulse response, since the difference between the reproduced waveform and the waveform obtained by the convolution processing of the record data and the pulse response is normalized based on the information obtained from the reproduced waveform, the laser power which provides a higher linearity of the waveform and a signal amplitude as high as possible can be determined with accuracy.

Although the present invention is described based on the preferred embodiment thereof heretofore, the recording process and the recording apparatus according to the present invention are not limited only to the above embodiment, the recording process and the recording apparatus altered without changing the gist of the present invention fall within the scope of the present invention. For example, the recording medium is not limited only to the phase-change optical disk and any of the optical recording media such as magneto-optical disk and write-once optical disk may be used as such. In addition, the 1-7 conversion used in the generation of the record data may be any conversion so long as it performs RLL encoding such as a 2-7 conversion.

The invention claimed is:

1. A method for adjusting a recording condition of optical information, comprising the steps of: irradiating an optical recording medium with laser light having a recording pulse waveform generated based on a recording signal, which is in synchrony with clock cycles, to form a record mark group on said optical recording medium; reading said record mark group to obtain a reproduced waveform, and adjusting the recording condition by sampling said reproduced waveform at a period shorter than a clock period to evaluate a linearity of said reproduced waveform, wherein said adjusting step linearly interpolates sampled values of said sampled reproduced waveform at a timing of R1 or R2 assuming a maximum, to extract times-series data of said reproduced waveform for respective clock cycles, given R1 and R2 being expressed by the following formula:

$$R1 = (n+1)\times\frac{\sum_i h_i^2}{\sum_k\left(y_k - \sum_i a_{k-1}\times h_i\right)^2} \text{ and}$$

$$R2 = \frac{\sum_k y_k^2}{\sum_k\left(y_k - \sum_i a_{k-1}\times h_i\right)^2}$$

(i being an integer satisfying $0\leq i\leq m$) respectively, wherein $\{a_0, a_1, \ldots, a_k, \ldots, a_{n-1}, a_n\}$ represent said times-series data for respective said clock cycles of the clock for recording said optical recording medium, $\{y_0, y_1, \ldots, y_k, \ldots, y_{n-1}, y_n\}$ represent time-series data of said reproducing waveform for respective said clock cycles (n being an integer not smaller than zero, and k being an integer satisfying $0\leq k\leq n$), and $\{h_0, h_1, \ldots, h_m\}$ represent pulse responses of a recording/reproducing system corresponding to a specific recording/reproducing condition (m being an integer satisfying $0\leq m\leq n$).

2. The method for adjusting the recording condition of optical information according to claim 1, wherein an index of said linearity is obtained by the following formula:

$$\varepsilon = \sum_k\left(y_k - \sum_i a_{k-i}\times h_i\right)^2$$

(i being an integer satisfying $0\leq i\leq m$), wherein $\{a_0, a_1, \ldots, a_k, \ldots, a_{n-1}, a_n\}$ represent said times-series data for respective said clock cycles of the clock for recording said optical recording medium, $\{y_0, y_1, \ldots, y_k, \ldots, y_{n-1}, y_n\}$ represent time-series data of said reproducing waveform for respective said clock cycles (n being an integer not smaller than zero, and k being an integer satisfying $0 \leq k \leq n$), and $\{h_0, h_1, \ldots, h_m\}$ represent pulse responses of a recording/reproducing system corresponding to a specific recording/reproducing condition (m being an integer satisfying $15 \leq m \leq n$).

3. A method for adjusting a recording condition of optical information, comprising the steps of: irradiating an optical recording medium with laser light having a recording pulse waveform generated based on a recording signal, which is in synchrony with clock cycles, to form a record mark group on said optical recording medium; reading said record mark group to obtain a reproduced waveform, and adjusting a recording condition by evaluating a linearity of said reproduced waveform, characterized in that:

said adjusting step is such that an index of the linearity is obtained by the following formula:

$$R1 = (n+1) \times \frac{\sum_i h_i^2}{\sum_k \left(y_k - \sum_i a_{k-1} \times h_i\right)^2}$$

(i being an integer satisfying $0 \leq i \leq m$), wherein $\{a_0, a_1, \ldots, a_k, \ldots, a_{n-1}, a_n\}$ represent said times-series data for respective said clock cycles of the clock for recording said optical recording medium, $[y_0, y_1, \ldots, y_k, \ldots, y_{n-1}, y_n]$ represent time-series data of said reproducing waveform for respective said clock cycles (n being an integer not smaller than zero, and k being an integer satisfying $0 \leq k \leq n$) and $\{h_0, h_1, \ldots, h_m\}$ represent pulse responses of a recording/reproducing system corresponding to a specific recording/reproducing condition (m being an integer satisfying $15 \leq m \leq n$).

4. A method for adjusting a recording condition of optical information, comprising the steps of: irradiating an optical recording medium with laser light having a recording pulse waveform generated based on a recording signal, which is in synchrony with clock cycles, to form a record mark group on said optical recording medium; reading said record mark group to obtain a reproduced waveform, and adjusting the recording condition by evaluating a linearity of said reproduced waveform, characterized in that:

said adjusting step is such that an index of the linearity is obtained by the following formula:

$$R2 = \frac{\sum_k y_k^2}{\sum_k \left(y_k - \sum_i a_{k-1} \times h_i\right)^2}$$

(i being an integer satisfying $0 \leq i \leq m$), wherein $\{a_0, a_1, \ldots, a_k, \ldots, a_{n-1}, a_n\}$ represent said times-series data for respective said clock cycles of the clock for recording on said optical recording medium, $\{y_0, y_1, \ldots, y_k, \ldots, y_{n-1}, y_n\}$ represent time-series data of said reproducing waveform for respective said clock cycles (n being an integer not smaller than zero), and k being an integer satisfying $0 \leq k \leq n$), and $\{h_0, h_1, \ldots, h_m\}$ represent pulse responses of a recording/reproducing system corresponding to a specific recording/reproducing condition (m being an integer satisfying $15 \leq m \leq n$).

5. The method for adjusting the recording condition of optical information according to claim 3 or 4, wherein said adjusting step includes the steps of sampling said reproduced waveform at a period shorter than a clock period, and extracting time-series data of said reproduced waveform for respective said clock cycles by linearly interpolating sampled values of said sampled reproduced waveform at a timing of said R1 or R2 assuming a maximum, given R1 and R2 being expressed by the following formula:

$$R1 = (n+1) \times \frac{\sum_i h_i^2}{\sum_k \left(y_k - \sum_i a_{k-1} \times h_i\right)^2} \text{ and}$$

$$R2 = \frac{\sum_k y_k^2}{\sum_k \left(y_k - \sum_i a_{k-1} \times h_i\right)^2}$$

(i being an integer satisfying $0 \leq i \leq m$) respectively, wherein $\{a_0, a_1, \ldots, a_k, \ldots, a_{n-1}, a_n\}$ represent said times-series data for respective said clock cycles of the clock for recording said optical recording medium, $\{y_0, y_1, \ldots, y_k, \ldots, y_{n-1}, y_n\}$ represent time-series data of said reproducing waveform for respective said clock cycles (n being an integer not smaller than zero, and k being an integer satisfying $0 \leq k \leq n$), and $\{h_0, h_1, \ldots, h_m\}$ represent pulse responses of a recording/reproducing system corresponding to a specific recording/reproducing condition (m being an integer satisfying $0 \leq m \leq n$).

6. The method for adjusting the recording condition of optical information according to any one of claims 1, 2, 3, and 4, wherein said optical recording medium is a phase-change optical recording medium, and wherein, upon forming said record mark group on said phase-change optical recording medium by irradiating said phase-change optical recording medium with the laser light, an overwrite operation is conducted twice before obtaining said reproduced waveform.

7. The method for adjusting the recording condition of optical information according to any one of claims 1, 2, 3, and 4, wherein three or more of said record mark groups are recorded using recording pulse waveforms having the same form, said record mark groups are reproduced to sample three or more reproduced waveforms, and samples values of said sampled reproduced waveforms are averaged.

8. The method for adjusting the recording condition of optical information according to any one of claims 1, 2, 3, and 4, wherein said record mark group is recorded by using a single recording pulse having a specific waveform, and said record mark group is reproduced for three or more times to sample three or more reproduced waveforms, and sampled values of said sampled reproduced waveforms are averaged.

9. The method for adjusting the recording condition of optical information according to claim 7, wherein said three or more record mark groups are formed on a single track of said optical recording medium.

10. The method for adjusting the recording condition of optical information according to claim 3, wherein said R1 is adjusted so as to satisfy $10 \times \log R1 > 20 - 20(l/w)$ dB, given "w" being a beam diameter of the laser beam used for recording/reproducing information, given "l" being a shortest mark length to be recorded on the optical-information recording medium.

11. The method for adjusting the recording condition of optical information according to claim 4, wherein said R2 is adjusted so as to satisfy 10×log R2>21-20(l/w) dB, given "w" being a beam diameter of the laser beam used for recording/reproducing information, given "l" being a shortest mark length to be recorded on the optical-information recording medium.

12. The method for adjusting the recording condition of optical information according to claim 2, 3, 4, 10 or 11, wherein said $h_i$ has a value determined using a least-squares method, and has a non-zero width larger than 15T, given T being a reference clock of data.

13. The method for adjusting the recording condition of optical information according to any one of claims 1, 2, 3, 4, 10, and 11, wherein, when the data recorded on said optical information recording medium are expressed by "1" or "0", a reference data is added before said recording signal as a reference timing for sampling said reproduced waveform, said reference data having a duration of data "1" or data "0" different from the width of said recording signal.

14. A recording/reproducing apparatus for optical information, comprising:

an optical head irradiating an optical recording medium with laser light to receive reflected light therefrom;

a laser drive for changing an optical intensity of an laser output thereof; and a control section having the functions of: converting a recording signal, which is in synchrony with clock cycles, into a recording pulse waveform to transmit the same to said laser drive; sampling a reproduced waveform, reproduced from record marks on said optical recording medium, at a period shorter than a clock period; interpolating the sampled values; evaluating a difference between a waveform obtained by convolution of pulse responses determined from said reproduced waveform and said recording signal and a waveform obtained by sampling said reproduced waveform and interpolating sampled values thereof at a timing of R1 or R2 assuming a maximum, to adjust a width or power of said recording pulse waveform, given R1 and R2 being expressed by the following formula:

$$R1 = (n+1) \times \frac{\sum_i h_i^2}{\sum_k \left(y_k - \sum_i a_{k-1} \times h_i\right)^2} \text{ and}$$

$$R2 = \frac{\sum_k y_k^2}{\sum_k \left(y_k - \sum_i a_{k-1} \times h_i\right)^2}$$

(i being an integer satisfying $0 \leq i \leq m$) respectively, wherein $\{a_0, a_1, \ldots, a_k, \ldots, a_{n-1}, a_n\}$ represent said times-series data for respective said clock cycles of the clock for recording said optical recording medium, $\{y_0, y_1, \ldots, y_k, y_{n-1}, y_n\}$ represent time-series data of said reproducing waveform for respective said clock cycles (n being an integer not smaller than zero, and k being an integer satisfying $0 \leq k \leq n$), and $\{h_0, h_1, \ldots, h_m\}$ represent pulse responses of a recording/reproducing system corresponding to a specific recording/reproducing condition (m being an integer satisfying $0 \leq m \leq n$).

15. The recording/reproducing apparatus according to claim 14, wherein said evaluating is such that an index $\epsilon$ expressed by:

$$\varepsilon = \sum_k \left(y_k - \sum_i a_{k-i} \times h_i\right)^2;$$

is evaluated to adjust said recording condition, where $15 \leq m \leq n$.

16. The recording/reproducing apparatus according to claim 14 or 15, wherein said optical recording medium is a phase-change optical recording medium, and wherein, upon forming said record mark group on said phase-change optical recording medium by irradiating said phase-change optical recording medium with the laser light, an overwrite operation is conducted twice or more before obtaining said reproduced waveform.

17. The recording/reproducing apparatus according to claim 13, wherein a function of obtaining said reproduced signal includes the function of averaging three or more reproduced waveforms obtained by reproducing a plurality of record mark groups recorded by a plurality of recording pulses having the same waveform, or the function of averaging thee or more reproduced waveforms obtained by reproducing for a plurality of times a mark group recorded by a specified recording pulse waveform.

18. The recording/reproducing apparatus according to claim 15, wherein said control section controls said recording condition by defining the following formula:

$$R1 = (n+1) \times \frac{\sum_i h_i^2}{\sum_i \left(y_k - \sum_i a_{k-1} \times h_i\right)^2},$$

and said control section further has a function of determining a recording or erasing laser power so as to satisfy 10×log R1>20-20(l/w) dB, given w being a beam diameter of the laser beam, given l being a shortest mark length among said record mark group.

19. The recording/reproducing apparatus according to claim 15, wherein said control section controls said recording condition by defining the following formula:

$$R2 = (n+1) \times \frac{\sum_k y_k^2}{\sum_k \left(y_k - \sum_k a_{k-1} \times h_i\right)^2},$$

and said control section further has a function of determining a recording or erasing laser power so as to satisfy 10×log R2>21-20(l/w) dB, given w being a beam diameter of the laser beam, given l being a shortest mark length among said record mark group.

* * * * *